(12) United States Patent
Ozaki

(10) Patent No.: US 6,674,698 B2
(45) Date of Patent: Jan. 6, 2004

(54) METHOD OF CREATING SECURITY MEDIUM, DEVICE FOR CREATING SECURITY MEDIUM, AND REPRODUCING DEVICE

(75) Inventor: Koji Ozaki, Kato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/359,565

(22) Filed: Feb. 7, 2003

(65) Prior Publication Data

US 2003/0123348 A1 Jul. 3, 2003

Related U.S. Application Data

(63) Continuation of application No. PCT/JP00/08111, filed on Nov. 17, 2000.

(51) Int. Cl.$^7$ ................................................. G11B 5/09
(52) U.S. Cl. ................................. 369/47.14; 369/53.21
(58) Field of Search ........................... 369/47.12, 47.13, 369/47.14, 47.15, 47.55, 53.15, 53.16, 53.17, 53.2, 53.21, 53.37, 53.42, 53.41, 53.45

(56) References Cited

FOREIGN PATENT DOCUMENTS

| JP | 63-291266 | 11/1988 |
|----|-----------|---------|
| JP | 6-274995 | 9/1994 |
| JP | 11-213548 | 8/1999 |
| JP | 2000-155943 | 6/2000 |
| JP | 2000-215613 | 8/2000 |

*Primary Examiner*—Paul W. Huber
(74) *Attorney, Agent, or Firm*—Staas & Halsey LLP

(57) ABSTRACT

An object of the present invention is achieved by a security medium creating method for providing a recording medium with security, the method including a medium defect information acquiring step of acquiring medium defect information concerning a medium defect of a first recording medium including recording data requiring security, a medium defect information recording step of recording the foregoing medium defect information acquired by the foregoing medium defect information acquiring step on a second recording medium, and a false defect information recording step of recording false medium defect information in a predetermined defect information recording area in which the foregoing medium defect information of the foregoing first recording medium is recorded so as to provide the security, wherein an access to the foregoing first recording medium is made impossible by the foregoing false defect information recording step.

13 Claims, 8 Drawing Sheets

FIG.6
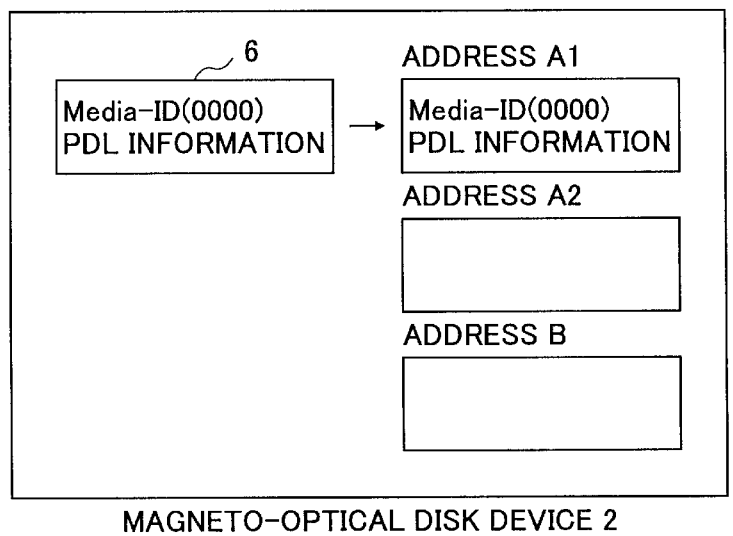
SECURITY MEDIUM (Media-ID=0000)
MAGNETO-OPTICAL DISK DEVICE 2
FIG.7
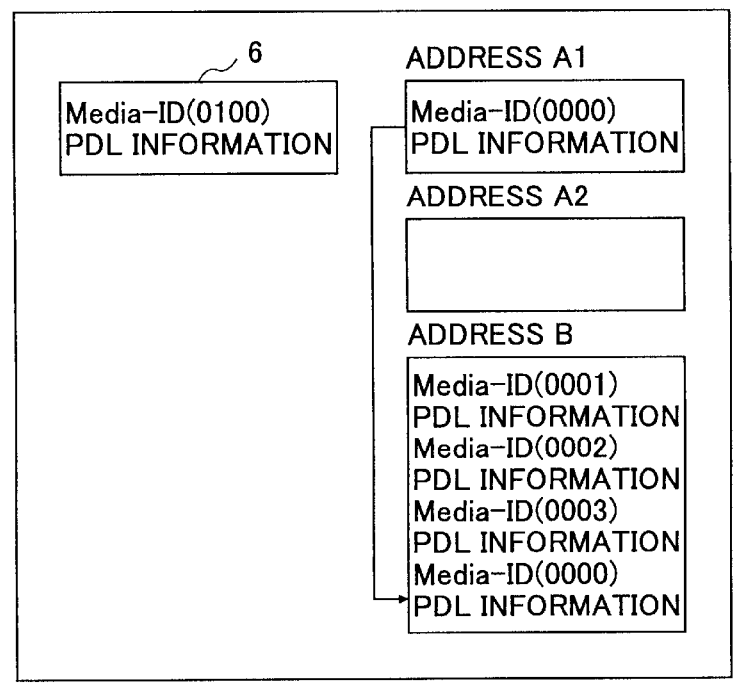
KEY MEDIUM (Media-ID=0100)
Media-ID(1-3) PDL INFORMATION
MAGNETO-OPTICAL DISK DEVICE 2

MAGNETO-OPTICAL DISK DEVICE 2

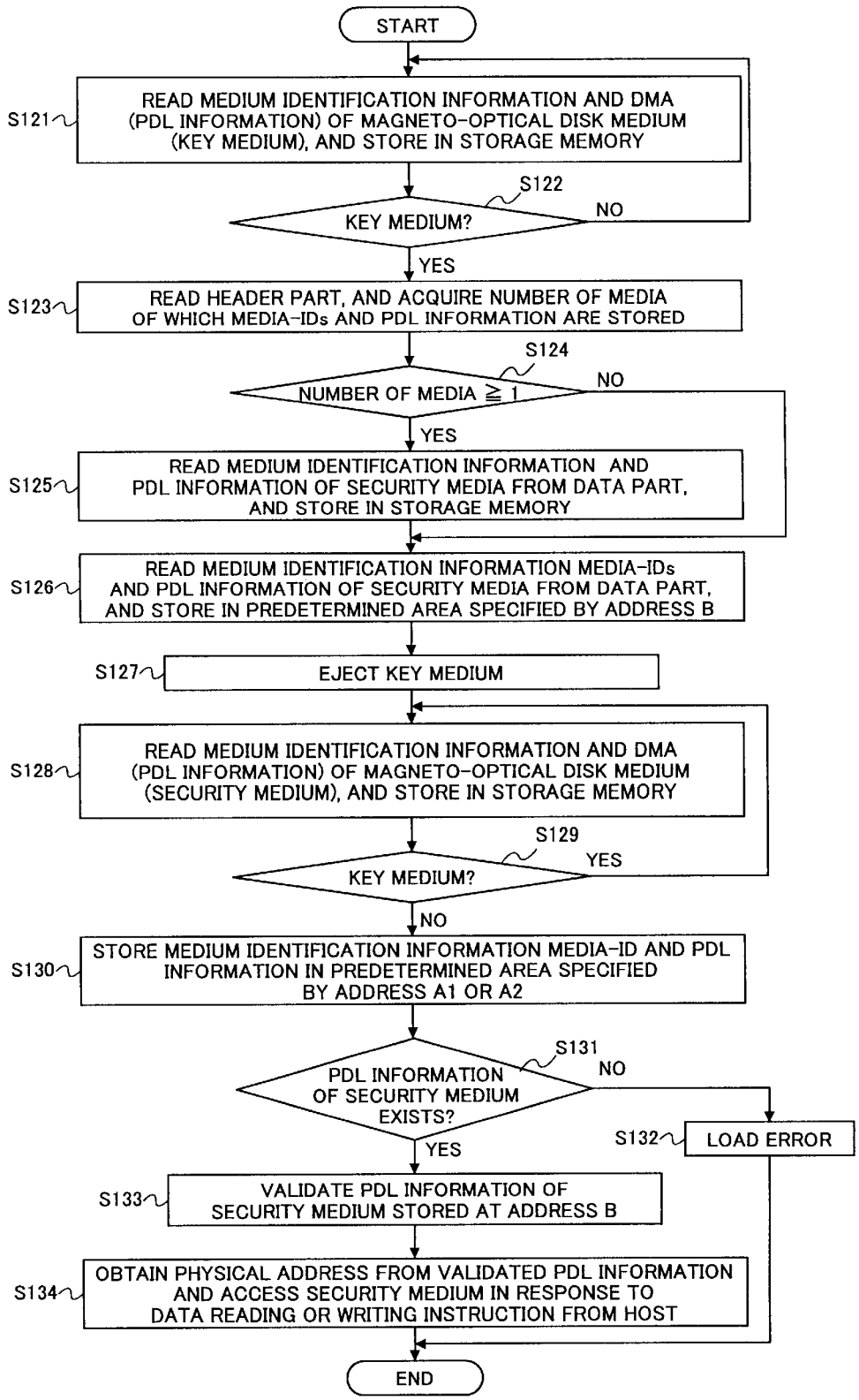

METHOD OF CREATING SECURITY MEDIUM, DEVICE FOR CREATING SECURITY MEDIUM, AND REPRODUCING DEVICE

This application is a continuation of PCT/JP00/08111, filed Nov. 17, 2000.

TECHNICAL FIELD

The present invention relates to a security medium creating method and a security medium creating device for creating a medium provided with security that prevents a leakage of recording data, and a reproducing device for reproducing data recorded on the medium provided with the security.

BACKGROUND ART

In a conventional method for providing a security for a magneto-optical disk medium, a security query command including information, such as a password, is issued from a host to a magneto-optical disk device by using a security application, and only when the password matches, an access to the magneto-optical disk medium is made possible.

In such a security medium on which recording data is protected by a password, the password is written to or read from s security area of the magneto-optical disk medium; therefore, upon using the security medium, a format specification of the magneto-optical disk medium needs to be changed.

Additionally, realizing the security for the magneto-optical disk device necessitates an application dedicated for security which is activated on the host that updates or inquires the password.

Further, an operator has to perform bothersome operations, such as starting the security-dedicated application and entering the password. Yet, there has been a problem that the operator may forget the password, and cannot access the magneto-optical disk medium, in such a case where the application is not used for a long period of time.

Besides, the security area to which the password is written needs to be provided beforehand on a physical format aside from a user data area in the magneto-optical disk medium; therefore, a security function has been unable to be realized for a conventionally used magneto-optical disk medium having a low capacity ranging approximately from 128 MB to 640 MB without the security area.

A first object of the present invention is to provide a security medium creating method for creating a medium provided with security that prevents a leakage of recording data without requiring a password.

Additionally, a second object of the present invention is to provide a security medium creating device that provides a security by the security medium creating method.

Further, a third object of the present invention is to provide a reproducing device for reproducing data recorded on the medium provided with the security.

DISCLOSURE OF INVENTION

In order to achieve the foregoing first object, the present invention, which is a security medium creating method for providing a recording medium with security, is arranged to include a medium defect information acquiring step of acquiring medium defect information concerning a medium defect of a first recording medium including recording data requiring security, a medium defect information recording step of recording the foregoing medium defect information acquired by the foregoing medium defect information acquiring step on a second recording medium, and a false defect information recording step of recording false medium defect information in a predetermined defect information recording area in which the foregoing medium defect information of the foregoing first recording medium is recorded so as to provide the security, wherein an access to the foregoing first recording medium is made impossible by the foregoing false defect information recording step.

According to this security medium creating method, the medium defect information necessary for accessing the first recording medium storing data is stored in the second recording medium, and the false defect information is recorded on the foregoing first recording medium, whereby an access to the foregoing first recording medium is made impossible.

The foregoing defect information is PDL (Primary Defect List) information detected upon physically formatting the recording medium, SDL (Secondary Defect List) information detected upon writing data to the recording medium, and so forth.

The foregoing predetermined defect information recording area is a DMA (Defect Management Area) in which the foregoing PDL and SDL information is recorded.

Additionally, in order to achieve the foregoing second object, the present invention, which is a security medium creating device providing a recording medium with security, is arranged to include a medium defect information acquiring part for acquiring medium defect information concerning a medium defect of a first recording medium including recording data requiring security, a medium defect information recording part for recording the foregoing medium defect information acquired by the foregoing medium defect information acquiring part on a second recording medium, and a false defect information recording part for recording false medium defect information in a predetermined defect information recording area in which the foregoing medium defect information of the foregoing first recording medium is recorded so as to provide the security, wherein an access to the foregoing first recording medium is made impossible by the foregoing false defect information recording part.

According to this security medium creating device, the medium defect information necessary for accessing the first recording medium storing data is stored in the second recording medium, and the false defect information is recorded on the foregoing first recording medium, whereby an access to the foregoing first recording medium is made impossible.

Further, in order to achieve the foregoing third object, the present invention, which is a reproducing device enabling an access to a security medium provided with security by false medium defect information, is arranged to include a medium defect acquiring part for acquiring medium defect information concerning a medium defect of the security medium from a key medium storing the foregoing medium defect information, and an address acquiring part for acquiring an address to be accessed, according to the foregoing medium defect information acquired by the foregoing medium defect acquiring part, upon accessing the security medium.

According to this reproducing device, an access to the security medium on which the false medium defect information is recorded can be performed according to the medium defect information recorded in the key medium.

Therefore, an operator can access the security medium without performing bothersome operations, such as entering a password.

BRIEF DESCRIPTION OF DRAWINGS

FIG. 6 is a diagram illustrating the security medium creating process.

FIG. 7 is a diagram illustrating the security medium creating process.

FIG. 10 is a flowchart for explaining another example of the address conversion process.

BEST MODE FOR CARRYING OUT THE INVENTION

Hereinbelow, a description will be given, with reference to the drawings, of embodiments according to the present invention.

Figure 1:
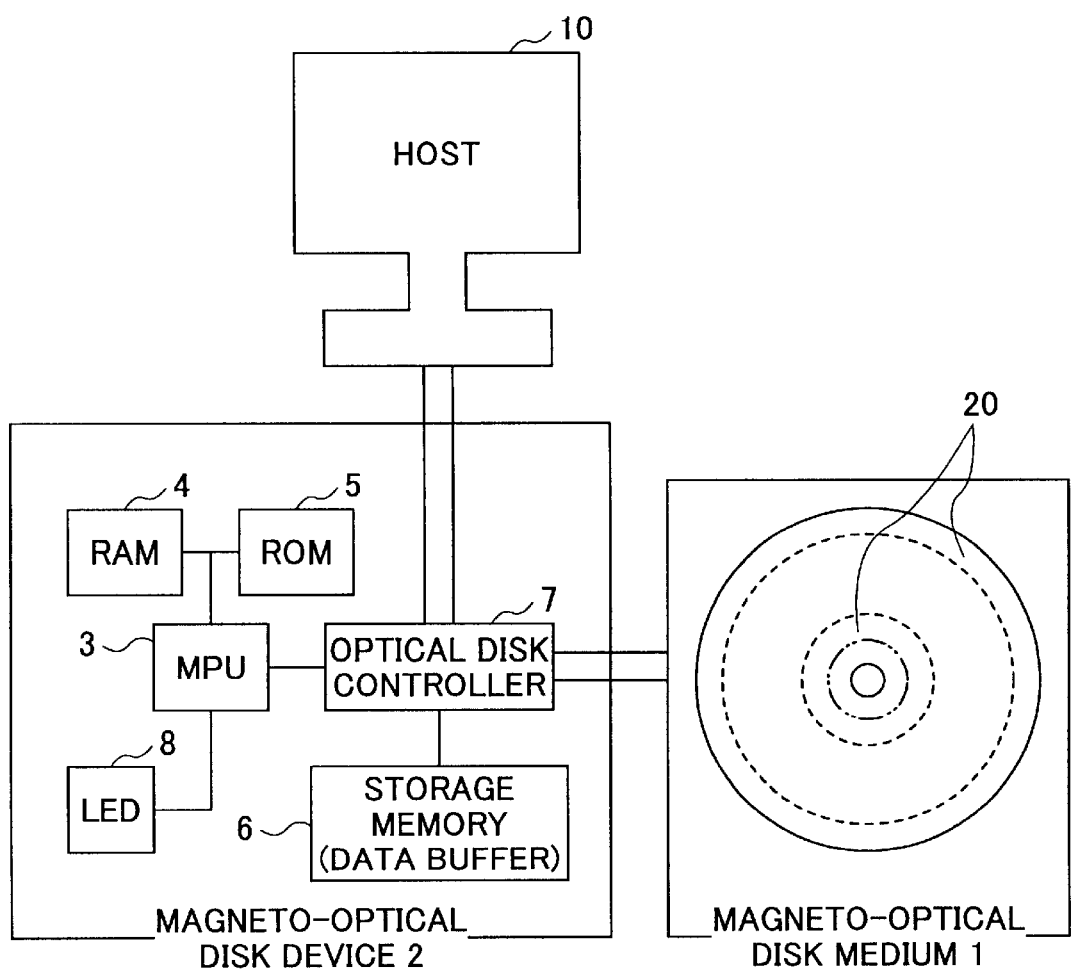
FIG. 1 is a diagram showing a hardware configuration of a magneto-optical disk device.

FIG. 1 is a diagram showing a hardware configuration of a magneto-optical disk device.

In FIG. 1, a magneto-optical disk device 2 according to one embodiment of the present invention comprises an MPU 3, a RAM 4, a ROM 5, a storage memory 6 as a data buffer, an optical disk controller 7, and an LED 8, and is connected to a host 10 and a magneto-optical disk medium 1.

The MPU 3 controls the magneto-optical disk device 2 as a whole according to a command issued from the host 10. The MPU 3 acquires defect information from a DMA (Defect Management Area) 20 in which management information of the magneto-optical disk medium 1 is stored, and stores the defect information in the RAM 4. The MPU 3 performs an address conversion process of converting a logical address specified by the host 10 into a physical address.

Additionally, when necessary, the MPU 3 performs a certifying process of physically formatting (initializing) the magneto-optical disk medium 1 so as to acquire a PDL (Primary Defect List) representing defect information upon the formatting.

Further, when an instruction specifying a security to be provided is sent from the host 10, the MPU 3 performs a security medium creating process of creating an inaccessible security medium by reading the DMA 20 of the magneto-optical disk medium 1, storing the DMA 20 in the storage memory 6, and rewriting the DMA 20 with dummy defect information. In the security medium creating process, for the purpose of accessing the security medium, a key medium is also created on which the DMA 20 of the security medium stored in the storage memory 6 is recorded. The LED 8 is caused to be flashing during the security medium creating process.

Additionally, according to information of the DMA 20 recorded on the key medium, the MPU 3 performs a reproducing process of reproducing data recorded on the magneto-optical disk medium 1 provided with the security.

Under a control of the MPU 3, the optical disk controller 7 controls a data transfer process of transferring data between the host 10 and the magneto-optical disk device 2, and also controls a writing (write) process and a reading (read) process of data between the magneto-optical disk medium 1 and the magneto-optical disk device 2 according to the physical address converted by the MPU 3.

The ROM 5 stores data necessary for controlling the magneto-optical disk device 2, and is referred to by the MPU 3.

First, a description will be given of the certifying process performed by the MPU 3.

Figure 2:
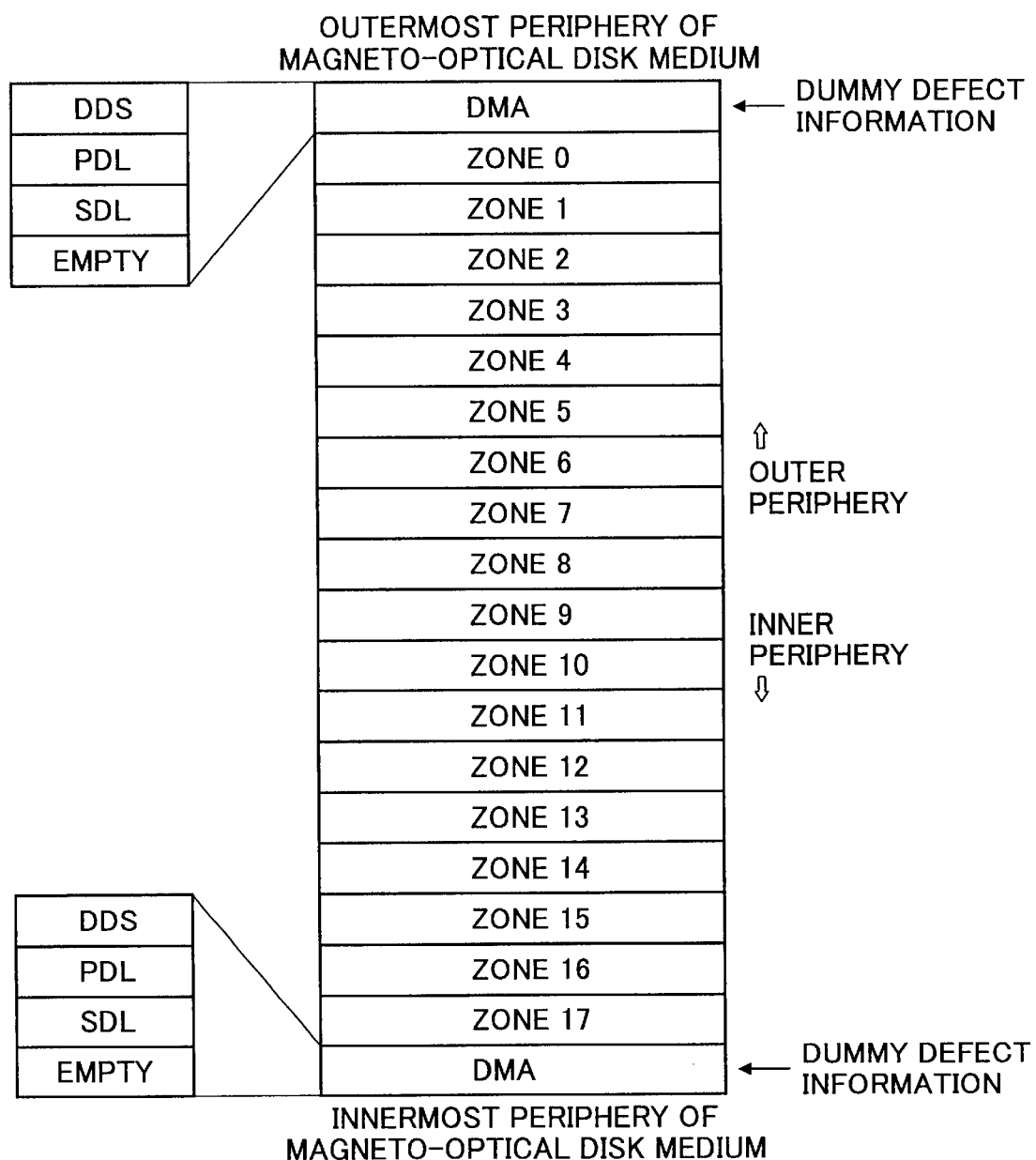
FIG. 2 is a diagram showing an example of a recording area physically formatted by a certifying process.

FIG. 2 is a diagram showing an example of a recording area physically formatted by the certifying process.

In FIG. 2, by the certifying process, the magneto-optical disk medium 1 of 1.3 GB, for example, is divided into 18 zones 0–17, and DMAs are formed at outer and inner peripheries. Each of the DMAs forms areas of a DDS (Disk Definition Structure) representing a disk structure, a PDL (Primary Defect List) representing defect information detected upon physical formatting, and an SDL (Secondary Defect List) representing defect information detected upon data writing.

The host 10 shown in FIG. 1 issues a physical format command to the magneto-optical disk device so as to instruct the magneto-optical disk device to perform a physical formatting.

The magneto-optical disk device 2 starts the physical formatting of the magneto-optical disk medium 1 according to the instruction from the host 10. Defective sector information detected during the physical formatting process is stored in the storage memory 6 of the magneto-optical disk device 2.

Normally, the detected sector information is written to the PDL in the DMA area of the magneto-optical disk medium 1, and the certifying process is ended.

The magneto-optical disk medium 1 physically formatted as above is accessed hereafter according to the defect information of the PDL and the SDL. Specifically, upon applying power to the magneto-optical disk device 2 or upon inserting the magneto-optical disk medium, the DMA 6 of the magneto-optical disk medium 1 is read by the reading process, and the PDL and the SDL are stored in the storage memory 6 of the magneto-optical disk device 2.

When an instruction ordering a reading or writing of data at a specified logical address is made from the host 10 to the magneto-optical disk device 2, the specified logical address is converted into a physical address by the address conversion process according to the information represented by the PDL and the SDL stored in the storage memory 6. The MPU 3 performs the reading or writing process of the data with respect to the converted physical address by the optical disk controller 7. Upon completion of the reading or writing process of the data, the host 10 is informed of the completion.

The address conversion process performed by the MPU 3 is a process of converting a logical address specified from the host 10 into a physical address specified by a physical track and a physical sector. First, the MPU 3 obtains a tentative physical address on an assumption that no defect exists on the medium. Specifically, data sector numbers are summed from a zone having a small logical address set in each medium so as to obtain a cumulative data sector number. The cumulative data sector number is compared with the logical address, and when the cumulative data sector number becomes larger than the logical address, the summing is stopped, and it is determined what number sector S counted from the top of the corresponding zone the tentative physical address corresponding to the logical address corresponds to. The sector S is divided by a physical sector number (e.g., 24 physical sectors in a case of the zone 17 shown in FIG. 2) per physical track of the corresponding zone, and the quotient is added to a physical track (e.g., a physical track 35366 in the case of the zone 17 shown in FIG. 2) at the top of the corresponding zone so as to obtain a tentative physical track, and the remainder is obtained as a tentative sector address.

Then, it is examined whether there exists a defect to be considered upon obtaining the physical address from the logical address. For example, when a primary defect (PDL) exists at an address smaller than the tentative physical address of the corresponding zone in the corresponding zone, the tentative physical address is shifted by adding a sector number of the primary defect thereto. Further, it is verified by the SDL whether the physical address obtained by adding to the tentative physical address is an address replaced due to an error caused upon data writing. When the corresponding sector is verified not to be a replaced defective sector, the corresponding sector is obtained as an authentic physical address. When the corresponding sector is registered in the defect information (the SDL), a replacing address stored in the defect information is made to be the authentic physical address. Thus, the authentic physical address can be obtained by shifting the tentative physical address to the extent of defects existing in the PDL and the SDL.

Next, a description will be given of the security medium creating process of creating the security medium and the key medium.

Figure 3:
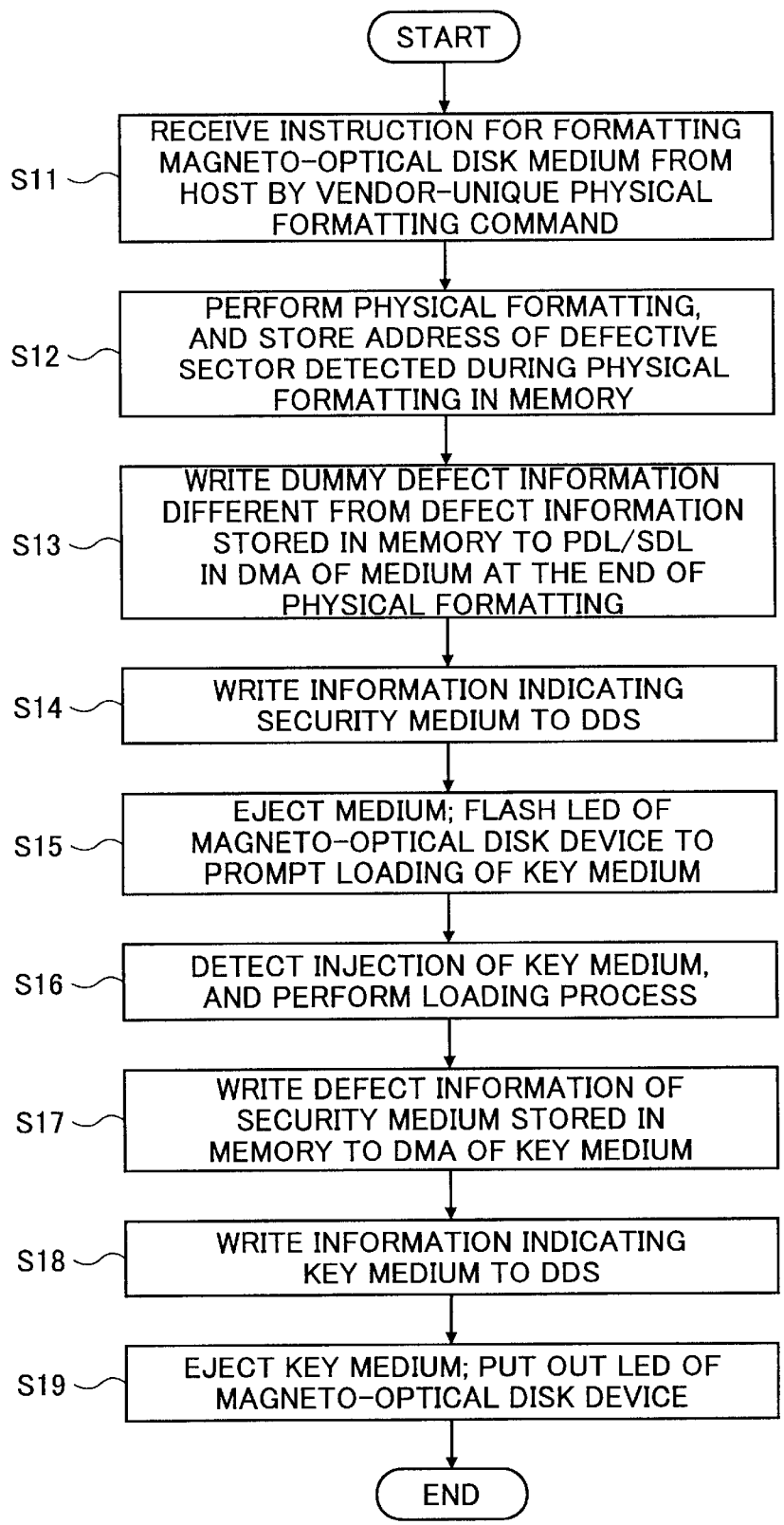
FIG. 3 is a flowchart for explaining an example of a security medium creating process.

FIG. 3 is a flowchart for explaining an example of the security medium creating process.

When an operator starts a security application on the host 10 so as to create a security medium, a message is output to prompt the operator to set the magneto-optical disk medium 1, which is to be provided with security, in the magneto-optical disk device 2. When the operator sets the magneto-optical disk medium 1 in response to the message, the host 10 issues a command to order a vendor-unique physical formatting with respect to the magneto-optical disk medium 1 set as above.

According to the command, the MPU 3 receives an instruction for performing the physical formatting of the magneto-optical disk medium 1 by the host 10 issuing the command (step S11). The MPU 3 executes the certifying process by the optical disk controller 7 so as to perform the physical formatting of the magneto-optical disk medium 1. The MPU 3 stores information of defective sectors detected during the physical formatting in the storage memory 6 (step S12). Conventionally, the information of defective sectors stored in the storage memory 6 is written to the PDL and the SDL in the DMA area at the end of the certifying process.

In the above-described embodiment, the information of defective sectors is not written to the physically formatted magneto-optical disk medium 1, but dummy defect information is written to the PDL and the SDL (step S13). The dummy defect information, which represents a series of N PDLs starting from a first sector of a first user data zone for example, is stored in the DMA area. Normally, important file management information is stored in the proximity of an address with a smallest logical address. However, storing the dummy defect information as above in the DMA area makes the file management information unable to be obtained normally upon data reading or writing, thereby disabling a data access to the magneto-optical disk medium 1.

Additionally, after the physical formatting of the magneto-optical disk medium 1, the MPU 3 updates the DDS by adding information, which indicates that the magneto-optical disk medium 1 is a security medium (a data medium) physically formatted according to the vendor-unique physical formatting command, to the DDS area at the top of the DMA (step S14).

After completion of writing the dummy defect information in the DMA, the physically formatted magneto-optical disk medium 1 is ejected. Additionally, the LED 8 of the magneto-optical disk device 2 is caused to be flashing so as to prompt the operator to insert a second magneto-optical disk medium 1 into the magneto-optical disk device 2 as a key medium on which the PDL and the SDL of the security medium stored in the storage memory 8 are to be written (step S15). The correct information of the PDL and the SDL not stored in the security medium are written to the DMA of the second magneto-optical disk medium 1; hereafter, the second magneto-optical disk medium 1 is referred to as "key medium" because the second magneto-optical disk medium 1 takes a role of a key upon accessing the security medium.

When the operator inserts the second magneto-optical disk medium 1 into the magneto-optical disk device 2 as the key medium, the optical disk controller 7 of the magneto-optical disk device 2 detects the injection of the key medium, and performs a loading process (step S16). Since the magneto-optical disk device 2 is in a state having transited to a key medium creating mode, the PDL and the SDL of the security medium stored in the storage memory 6 are written to the DMA area of the second magneto-optical disk medium 1 (step S17). Then, a key medium flag in the DDS of the DMA is set, the key medium flag indicating that the second magneto-optical disk medium 1 is a key medium (step S18).

The MPU 3 causes the optical disk controller 7 to eject the second magneto-optical disk medium 1 (step S19).

In this case, since the defect information of the security medium is stored in the DMA area of the second magneto-optical disk medium 1, the second magneto-optical disk medium 1 becomes a key medium exclusively for this security medium.

Next, a description will be given of the address conversion process in cases of performing the reading process and the writing process to the security medium created according to the above-described flowchart shown in FIG. 3.

Figure 4:
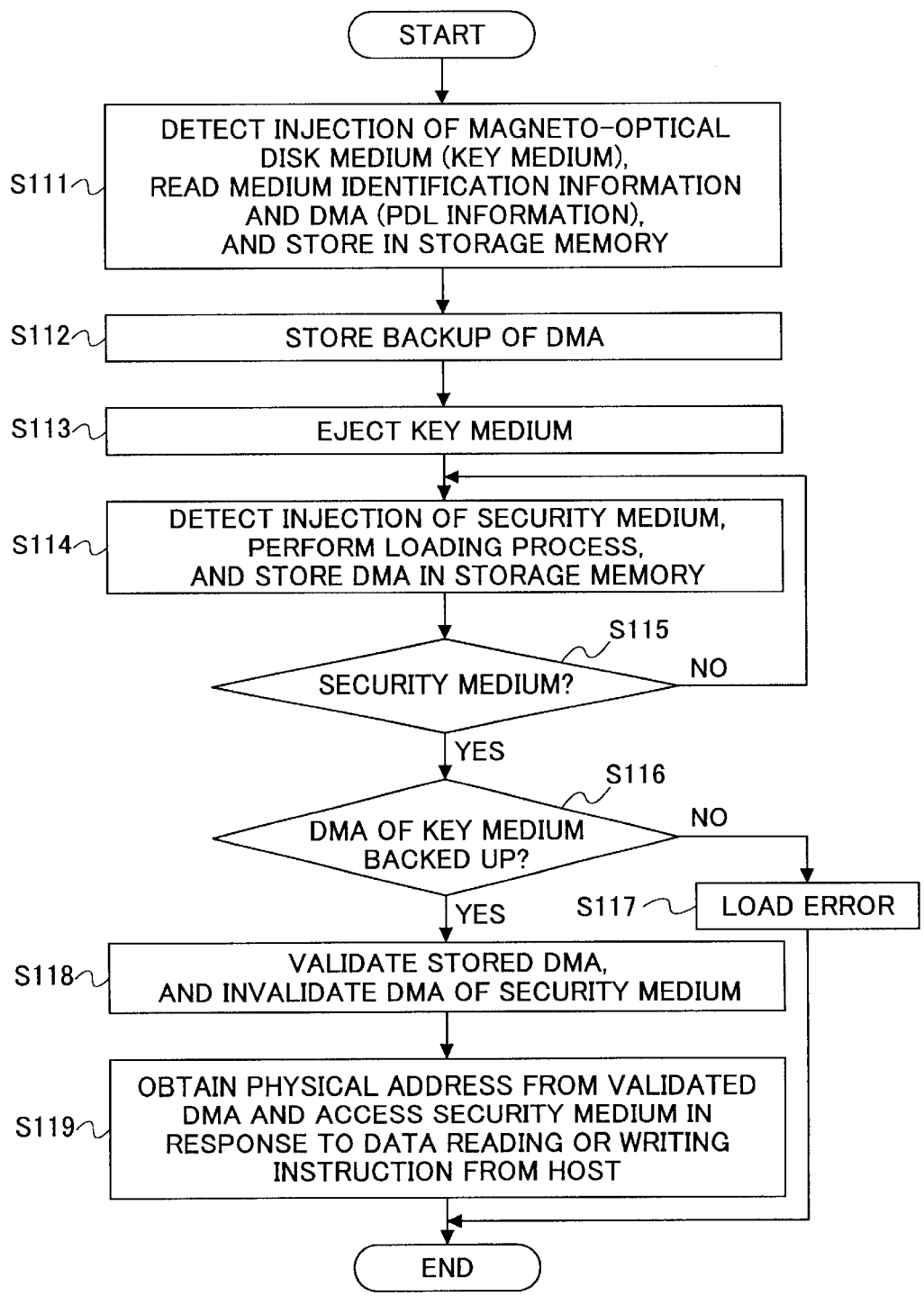
FIG. 4 is a flowchart for explaining an example of an address conversion process.

FIG. 4 is a flowchart for explaining an example of the address conversion process.

When the key medium storing medium identification information Media-ID and PDL information of the security medium in the DMA is set in the magneto-optical disk device 2 by an operator prior to using the security medium, the DMA of the magneto-optical disk medium 2 is stored in the storage memory 6 by a same loading process as a conventional loading process (step S111). Further, a backup of the DMA is stored in another predetermined area (step S112).

According to an instruction of the operator, the optical disk controller 7 ejects the key medium (step S113). In this course, contents of the storage memory 6 are caused to be retained.

Subsequently, the operator sets the security medium. The optical disk controller 7 detects the injection of the security medium, performs a loading process, and stores the DMA in the storage memory 6 (step S114).

The MPU 3 checks whether the DDS of the security medium includes the information indicating a security medium (step S115). When the magneto-optical disk medium 2 is not a security medium, the magneto-optical disk medium 2 is ejected, and an injection of a security medium is awaited. When the magneto-optical disk medium 2 is a security medium, it is checked whether the backup of the DMA of the key medium stored in the storage memory 6 exists in the storage memory 6 (step S116). A case where the backup does not exist is treated as a load error, and the address conversion process is ended (step S117).

In a case where the backup exists in the storage memory 6, the stored DMA is made valid, and the DMA of the security medium is made invalid hereafter in performing an address conversion (step S118).

According to a data reading or writing instruction from the host 10, a physical address is obtained according to the valid DMA so as to access the security medium (step S119).

In the above-described example of the security medium creating process shown in FIG. 3, the PDL and the SDL of the security medium stored in the storage memory 6 may be written, not to the DMA area of the second magneto-optical disk medium 1, but to data area. That is, writing the medium identification information identifying the security medium and the defect information to the data area enables one key medium to store defect information of a plurality of security media.

A description will be given, with reference to FIG. 5 to FIG. 9, of the security medium creating process capable of storing defect information of a plurality of security media.

Figure 5:
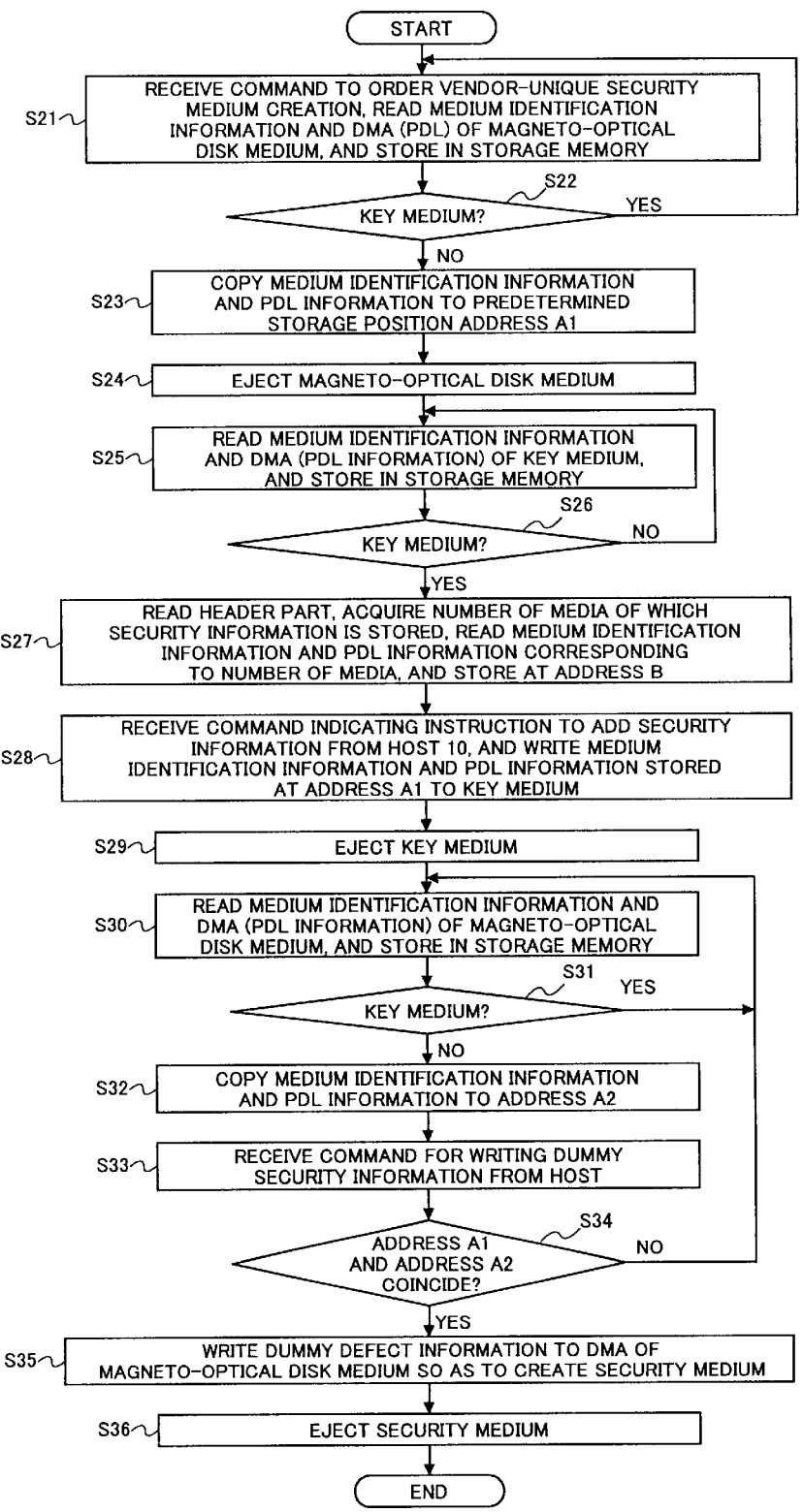
FIG. 5 is a flowchart for explaining another example of the security medium creating process.

FIG. 5 is a flowchart for explaining another example of the security medium creating process.

When an operator starts a security application on the host 10 so as to create a security medium, a message is output to prompt the operator to set the magneto-optical disk medium 1, which is to be provided with security, in the magneto-optical disk device 2. In response to the message, the operator sets the magneto-optical disk medium 1 requiring security.

The host 10 issues a command to order a vendor-unique security medium creation with respect to the magneto-optical disk medium 1 set as above.

Upon receiving this command, the MPU 3 reads the medium identification information (e.g., Media-ID(0000)) and the DMA (PDL information) of the magneto-optical disk medium 1, and stores the medium identification information and the DMA in the storage memory 6 (step S21).

The MPU 3 checks whether the magneto-optical disk medium 1 is a key medium (step S22). Specifically, the MPU 3 verifies whether the key medium flag provided in the DDS of the DMA of the magneto-optical disk medium 1 is set. In this case, since the magneto-optical disk medium 1 requiring security is inserted, the MPU 3 judges that the magneto-optical disk medium 1 is not a key medium, and performs step S23. On the other hand, when the magneto-optical disk medium 1 is a key medium, the MPU 3 proceeds to step S25.

In step S23, the MPU 3 copies the medium identification information Media-ID(0000) and the PDL information stored in the storage memory 6 to a predetermined storage position address A1, for example, as shown in FIG. 6.

According to an instruction from the security application executed on the host 10, the magneto-optical disk medium 1 is temporarily ejected (step S24). The security application outputs a message prompting the operator to set a key medium in the magneto-optical disk device 2.

When the operator sets the key medium according to the instruction of the message, the MPU 3 starts the reading process so as to read the medium identification information Media-ID(0100) and the DMA (PDL information) of the key medium by the optical disk controller 7, and stores the medium identification information Media-ID(0100) and the DMA (PDL information) in the storage memory 6 (step S25).

The MPU 3 checks whether the magneto-optical disk medium 1 set by the operator is a key medium (step S26). As checked in step S22, the MPU 3 checks the key medium flag in the DDS of the DMA. In this case, since the magneto-optical disk medium 1 is a key medium, the MPU 3 performs step S27 without copying the medium identification information and the PDL information read in step S25. On the other hand, when the magneto-optical disk medium 1 is not a key medium, the MPU 3 outputs again the message prompting the operator to set a key medium, returns to step S25, and waits for a key medium to be set.

Figure 9:
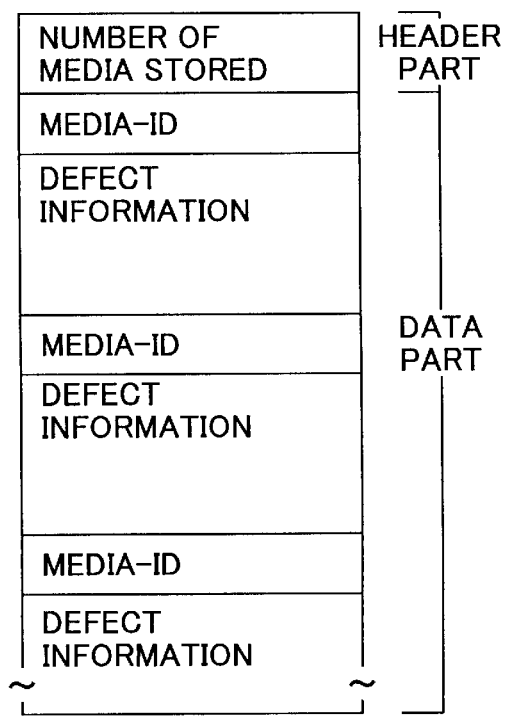
FIG. 9 is a diagram showing a structure of a key medium storing a plurality of security information sets.

The key medium comprises a header part and a data part, for example, as shown in FIG. 9. The number of media stored in the data part is written to the header part. The data part follows the header part, and security information sets each comprising the medium identification information (Media-ID) and the defect information (PDL information) are stored in the data part, the number of the security information sets corresponding to the number of the media indicated by the header part.

In step S27 where the magneto-optical disk medium 1 is a key medium according to the judgment in step S26, the header part of the key medium is read so as to acquire the number of the media of which security information is stored. When the number of the media is 0 (zero), the data part is not read. When the number of the media is equal to or larger than 1, the medium information Media-IDs and the PDL information are read from the data part, and are stored at a predetermined storage position in the magneto-optical disk device 2. For example, as shown in FIG. 7, the read medium information Media-IDs and the PDL information are stored in a predetermined area specified by an address B.

Figure 8:
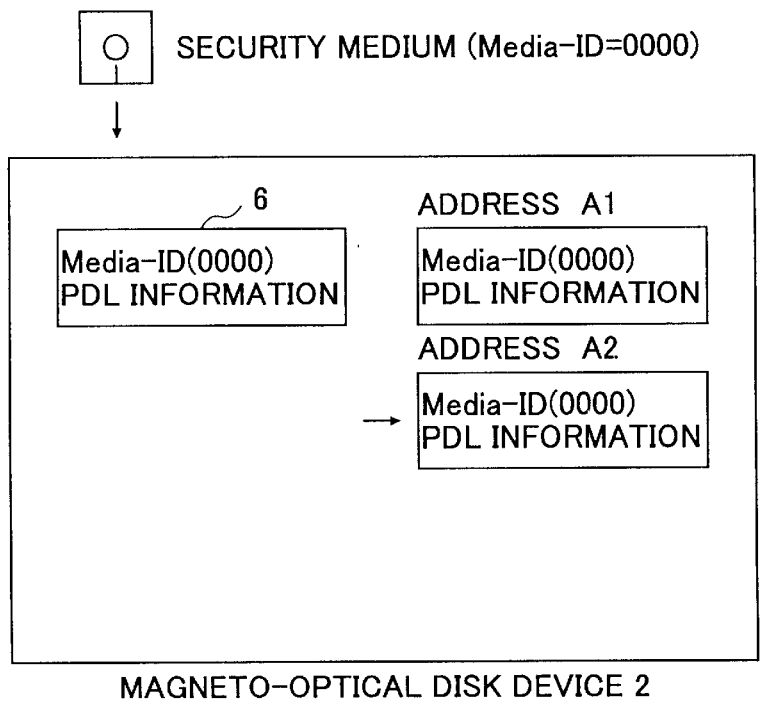
FIG. 8 is a diagram illustrating the security medium creating process.

A command indicating an instruction to add security information is issued from the application executed on the host 10. According to this command, the MPU 3 writes the medium identification information and the PDL information stored at the address A1 to the key medium (step S28). When the security information is not stored at the address A1, the writing to the key medium is not performed. When the security information is stored at the address A1, the number of the media of the header part is increased by 1, and as shown in FIG. 8, the security information at the address A1 is added to the end of the security information stored at the address B, and is stored. The security information stored at the address B is written to the key medium.

After completion of writing the security information to the key medium, the MPU 3 ejects the key medium according to a command from the security application which orders an ejection of the medium.

The security application outputs a message prompting the operator to set the initially set magneto-optical disk medium 1 in the magneto-optical disk device 2.

When the operator sets the magneto-optical disk medium with which to provide security according to the instruction of the message, the MPU 3 starts the reading process so as to read the medium identification information Media-ID (0100) and the DMA (PDL information) of the magneto-optical disk medium 1 by the optical disk controller 7, and stores the medium identification information Media-ID (0100) and the DMA (PDL information) in the storage memory 6 (step S30).

The MPU 3 checks whether the magneto-optical disk medium 1 set by the operator is a key medium (step S31). As checked in step S22, the MPU 3 checks the key medium flag in the DDS of the DMA. When the magneto-optical disk medium 1 is judged to be a key medium in the judgment of step S31, the security application outputs again the message prompting the operator to set the magneto-optical disk medium with which to provide security, returns to step S30, and waits for the magneto-optical disk medium to be set. In this case, since the magneto-optical disk medium 1 is not a key medium, the medium identification information and the PDL information read in step S30 is copied to a predetermined area. For example, as shown in FIG. 8, the medium identification information Media-ID(0100) and the DMA (PDL information) of the magneto-optical disk medium 1 are stored in the predetermined area indicated by an address A2 (step S32).

The security application issues to the magneto-optical disk device 2 a command indicating an instruction to write dummy security information.

In step S33, when the MPU 3 receives this command from the host 10 (step S33), the MPU 3 judges whether the Media-ID at the address A1 and the Media-ID at the address A2 coincide (step S34). When the Media-ID at the address A1 and the Media-ID at the address A2 do not coincide, the security application outputs again the message prompting the operator to set the magneto-optical disk medium with which to provide security, returns to step S30, and waits for the magneto-optical disk medium to be set. When the Media-ID at the address A1 and the Media-ID at the address A2 coincide, step S35 is performed.

In step S35, predetermined dummy defect information is written to the DMA of the magneto-optical disk medium 1, thereby creating a security medium (step S35).

According to a command made by the security application which indicates an instruction to order an ejection of the magneto-optical disk medium 1, the MPU 3 ejects the magneto-optical disk medium 1 having become a security medium.

The dummy defect information written in the above-described step S35 is information, for example, in which defective sectors indicated by defect information are arranged in order from an address with a smallest logical address. Alternatively, the dummy defect information is information in which N addresses of defective sectors equal to or smaller than a maximum defective sector number are not arranged in ascending order. It is prescribed in media standards that defective addresses be stored in ascending order; therefore, when a recording medium storing defective addresses not in ascending order is loaded, an error occurs so as to cause a state where the reading process cannot be performed.

Still alternatively, the dummy defect information is information in which the number of defective sectors indicated by the dummy defect information is equal to or larger than the maximum defective sector number. According to media standards, an operation is possible only within a maximum allowable number; therefore, when a recording medium storing defective information in which the number of defective sectors represents the maximum defective sector number or larger is loaded, an error occurs so as to cause a state where the reading process cannot be performed.

Further, the dummy defect information is information in which defective sectors indicated by the dummy defect information represent actually inexistent tracks or sectors. For example, the dummy defect information is PDL information representing a track number exceeding a maximum track number, or a sector number exceeding a maximum sector number. According to media standards, an operation is possible only within a maximum allowable quantity; therefore, when a recording medium storing a PDL representing actually inexistent tracks or sectors is loaded, an error occurs so as to cause a state where the reading process cannot be performed.

Besides, in the above-described embodiment, the security medium and the key medium may be media having different storage capacities. Specifically, a medium having a large storage capacity may be used as the security medium, and a medium having a small storage capacity may be used as the key medium.

A description will be given of the address conversion process for performing data reading and writing to the security medium by using the security medium and the key medium created by the security medium creating process shown in FIG. 5.

FIG. 10 is a flowchart for explaining another example of the address conversion process.

Prior to setting a security medium, an operator sets a key medium storing Media-IDs and PDL information of security media in the magneto-optical disk device 2.

When the optical disk controller 7 detects the injection of the magneto-optical disk medium 1, the optical disk controller 7 reads the Media-ID and the PDL information of the magneto-optical disk medium 1, and stores the Media-ID and the PDL information in the storage memory 6 (step S121).

The MPU 3 checks whether the magneto-optical disk medium 1 is a key medium (step S122). Specifically, the MPU 3 checks the key medium flag provided in the DDS of the DMA which indicates a key medium. When the magneto-optical disk medium 1 is not a key medium, the MPU 3 ejects the magneto-optical disk medium 1, and waits for a key medium to be set. When the magneto-optical disk medium 1 is a key medium, the Media-ID and the PDL information read in step S121 are not copied to a predetermined area, and are kept intact.

The MPU 3 reads the header part so as to acquire the number of the media of which the Media-IDs and the PDL information are stored (step S123). When the number of the media is 0, the data part storing the medium identification information and the PDL information of the security media is not read, and step S126 is performed. When the number of the media is equal to or larger than 1, the medium identification information Media-IDs and the PDL information of the security media are read from the data part, and are stored in the predetermined area specified by the address B (step S126). The medium identification information Media-IDs and the PDL information of a plurality of the security media are stored in the predetermined area at the address B.

According to an operation of the operator, the optical disk controller 7 ejects the key medium (step S127).

When the operator again sets a security medium, the optical disk controller 7 detects the injection of the security medium, and reads the medium identification information Media-ID and the PDL information of the security medium (step S128). For example, the medium identification information Media-ID of the security medium is "0000".

The MPU 3 checks the key medium flag provided in the DDS of the DMA which indicates a key medium (step S129). When the set medium is a key medium, the MPU 3 ejects the key medium, and waits for a security medium to be set. When the set medium is not a key medium, i.e., when the set medium is a security medium, the medium identification information Media-ID and the PDL information are stored in the predetermined area specified by the address A1 or A2 (step S130).

The MPU 3 checks whether the PDL information of the Media-ID=0000 exists at the address B (step S131). A case where the PDL information of the Media-ID=0000 does not exist is treated as a load error, and the address conversion process is ended (step S132). In a case where the PDL information of the Media-ID=0000 exists, the PDL information of the security medium stored at the address B is made valid (step S133). Hereafter, according to a data reading or writing instruction from the host 10, a physical address is obtained according to the valid PDL information so as to access the security medium (step S134).

According to the above-described embodiment, when the operator does not set the key medium first, but sets the security medium which is provided with security, i.e., in which the PDL information is dummy, an address conversion is performed according to the dummy PDL upon the host 10 ordering a reading or writing of data with a logical address, whereby a correct physical address cannot be obtained; thus, the security medium becomes unusable. Accordingly, stored confidential data can be prevented from leaking from the security medium to a third party.

Additionally, since a plurality of security media can be managed with one key medium, security can be realized for a multitude of media. For example, since a capacity of a general data buffer used in the magneto-optical disk device is 2 MB, a storage capacity of 4437 items×4 bytes=17.7 KB is required for a medium of 1.3 GB; accordingly, security information comprising the medium identification information Media-ID and the PDL information for approximately 118 media at the maximum can be stored. Security information for approximately 232 media of 640 MB, for approximately 232 media of 540 MB, for approximately 510 media of 230 MB, and for approximately 512 media of 128 MB can be managed with one key medium.

Further, when the security medium and the key medium are created, an operator does not have to remember bothersome passwords.

What is claimed is:

1. A security medium creating method for providing a recording medium with security, the method comprising:
    a medium defect information acquiring step of acquiring medium defect information concerning a medium defect of a first recording medium including recording data requiring security;
    a medium defect information recording step of recording said medium defect information acquired by said medium defect information acquiring step on a second recording medium; and
    a false defect information recording step of recording false medium defect information in a predetermined defect information recording area in which said medium defect information of said first recording medium is recorded so as to provide the security,
    wherein an access to said first recording medium is made impossible by said false defect information recording step.

2. The security medium creating method as claimed in claim 1, wherein said medium defect information acquiring step acquires the medium defect information by performing an initialization of said first recording medium.

3. The security medium creating method as claimed in claim 1, wherein said defect information recording step records said medium defect information of said first recording medium in a predetermined defect information recording area of said second recording medium.

4. The security medium creating method as claimed in claim 1, wherein said medium defect information acquiring step acquires medium identification information identifying a medium of said first recording medium and the medium defect information from said predetermined defect information recording area of said first recording medium, and
    said defect information recording step records said medium identification information and said medium defect information of said first recording medium additionally in a data area of said second recording medium.

5. The security medium creating method as claimed in claim 1, wherein said false defect information recording step records false medium defect information indicating that medium defects are present in an order from a physical address corresponding to a smallest logical address.

6. The security medium creating method as claimed in claim 1, wherein said false defect information recording step records false medium defect information in which medium defect information items indicating physical addresses of medium defects are not arranged in an ascending order of the physical addresses.

7. The security medium creating method as claimed in claim 1, wherein said false defect information recording step records false medium defect information in which a number of defective sectors indicating physical addresses of medium defects exceeds a maximum defect number.

8. The security medium creating method as claimed in claim 1, wherein said false defect information recording step records false medium defect information in which a position of a medium defect is indicated by an inexistent physical address.

9. The security medium creating method as claimed in claim 2, wherein said defect information recording step records said medium defect information of said first recording medium in a predetermined defect information recording area of said second recording medium.

10. A reproducing device enabling an access to a security medium provided with security by false medium defect information, the device comprising:
    a medium defect acquiring part for acquiring medium defect information concerning a medium defect of the security medium from a key medium storing said medium defect information; and
    an address acquiring part for acquiring an address to be accessed, according to said medium defect information acquired by said medium defect acquiring part, upon accessing the security medium.

11. The reproducing device as claimed in claim 10, wherein said medium defect acquiring part acquires the medium defect information of the security medium by reading said medium defect information of said security medium stored in a predetermined defect information recording area in which the medium defect information of said key medium is recorded.

12. The reproducing device as claimed in claim 10, wherein said medium defect acquiring part acquires medium identification information identifying media of a plurality of security media and medium defect information concerning medium defects of said security media by reading said medium identification information and said medium defect information stored in a data area of said key medium, and said address acquiring part acquires the address to be accessed, according to the medium defect information acquired by said medium defect acquiring part, the medium defect information corresponding to the medium identification information of the security medium to be accessed.

13. A security medium creating device providing a recording medium with security, the device comprising:

a medium defect information acquiring part for acquiring medium defect information concerning a medium defect of a first recording medium including recording data requiring security;

a medium defect information recording part for recording said medium defect information acquired by said medium defect information acquiring part on a second recording medium; and a false defect information recording part for recording false medium defect information in a predetermined defect information recording area in which said medium defect information of said first recording medium is recorded so as to provide the security, wherein an access to said first recording medium is made impossible by said false defect information recording part.

* * * * *

UNITED STATES PATENT AND TRADEMARK OFFICE
CERTIFICATE OF CORRECTION

PATENT NO. : 6,674,698 B2
DATED : January 6, 2004
INVENTOR(S) : Koji Ozaki

It is certified that error appears in the above-identified patent and that said Letters Patent is hereby corrected as shown below:

<u>Title page,</u>
Item [56], References Cited, U.S. PATENT DOCUMENTS, add the following:
-- 6,499,106      12/2002     Yaegashi et al.
   6,266,770      05/2001     Barchan --

Signed and Sealed this

Eighteenth Day of May, 2004

JON W. DUDAS
*Acting Director of the United States Patent and Trademark Office*